(12) United States Patent
Sabol (10) Patent No.: US 8,606,322 B2
(45) Date of Patent: Dec. 10, 2013

(54) PORTABLE CELLULAR BASE STATION CONFIGURATION

(75) Inventor: Eric Sabol, Mountain View, CA (US)

(73) Assignee: Raytheon Applied Signal Technology, Inc., Sunnyvale, CA (US)

( * ) Notice: Subject to any disclaimer, the term of this patent is extended or adjusted under 35 U.S.C. 154(b) by 230 days.

(21) Appl. No.: 12/911,679

(22) Filed: Oct. 25, 2010

(65) Prior Publication Data

US 2012/0099663 A1 Apr. 26, 2012

(51) Int. Cl.
*H04M 1/00* (2006.01)

(52) U.S. Cl.
USPC ........ 455/561; 455/410; 455/411; 455/456.5; 455/524; 455/525; 375/240.27; 375/243

(58) Field of Classification Search
USPC .............. 455/456.5, 524, 525, 561, 410, 411; 375/240.27, 243
See application file for complete search history.

(56) References Cited

U.S. PATENT DOCUMENTS

| 5,724,513 | A | * | 3/1998 | Ben-Nun et al. ............... 709/234 |
| 2001/0043644 | A1 | * | 11/2001 | Dooley et al. ................. 375/150 |
| 2004/0001269 | A1 | | 1/2004 | Itou et al. |
| 2006/0121907 | A1 | * | 6/2006 | Mori et al. ..................... 455/447 |
| 2008/0146158 | A1 | | 6/2008 | Pan et al. |
| 2009/0047945 | A1 | | 2/2009 | Zhang et al. |
| 2009/0099995 | A1 | | 4/2009 | Tzeng |
| 2009/0305702 | A1 | | 12/2009 | Toppinen et al. |
| 2009/0316649 | A1 | | 12/2009 | Chen |
| 2009/0323663 | A1 | | 12/2009 | Nakatsugawa |

(Continued)

FOREIGN PATENT DOCUMENTS

| DE | 19920222 A1 | 11/2000 |
| EP | 1051053 A2 | 11/2000 |
| WO | 2007027699 A2 | 3/2007 |
| WO | WO 2010/013032 A1 * | 2/2010 |

OTHER PUBLICATIONS

Meyer et al, "A Man-in-the-Middle Attack on UMTS," WiSe'04, Oct. 1, 2004, Philadelphia, Pennsylvania, USA, ACM 1-58113-925-X/04/0010, pp. 90-97.

(Continued)

*Primary Examiner* — Rafael Pérez-Gutiérrez
*Assistant Examiner* — Thai Vu
(74) *Attorney, Agent, or Firm* — Christie, Parker & Hale, LLP (57) ABSTRACT

A method and apparatus for configuring a portable first cellular base station to operate in a digital cellular telecommunications network includes: placing the first cellular base station in the digital cellular telecommunications network; detecting with a radio receiver at least one second operating cellular base station within the digital cellular telecommunications network; demodulating a first transmission of the at least one second cellular base station transmitter to obtain a first data stream; predictively modifying the first data stream to create a modified first data stream; correlating at least one periodic portion of the modified first data stream to form an enhanced data signal; decoding the enhanced data signal to obtain information including at least the location area code for the at least one second operating cellular base station and a neighbor list of neighboring cellular base station scrambling codes; and configuring the first cellular base station to have the same scrambling code as one of the neighboring cellular base stations, a different location area code from that neighboring cellular base station, and not to connect to any cell phone attempting to initiate a connection with it.

18 Claims, 2 Drawing Sheets

(56) References Cited

U.S. PATENT DOCUMENTS

| | | | |
|---|---|---|---|
| 2010/0015921 | A1 | 1/2010 | Yavuz et al. |
| 2010/0099431 | A1 | 4/2010 | Sampath et al. |
| 2010/0111022 | A1 | 5/2010 | Chang et al. |
| 2010/0150109 | A1 | 6/2010 | Bradley et al. |
| 2010/0278132 | A1* | 11/2010 | Palanki et al. ............... 370/329 |
| 2010/0311343 | A1* | 12/2010 | Keerthi ....................... 455/63.1 |

OTHER PUBLICATIONS

"C.I.A. Cell Phone Intercept Apparatus—Wireless Cell Phone Detection and Monitoring System," View Systems Inc. Product Brochure, www.viewsystems.com, Nov. 20, 2006.

Strobel D., "IMSI Catcher," Seminararbeit Ruhr—Universitat Bochum, Jul. 13, 2007.

Approved Judgment of the High Court of Justice Chancery Division Patents Court dated Mar. 11, 2009 in Case No: HC 2006 C02649 between MMI Research Limited, Claimant, and (1) Cellxion Limited (2) Cellxion Networks LLC (3) Mark Brumpton (4) Datong Electronics PLC (5) Rohde & Schwarz GMBH & CO. KG. (6) Anthony Timson, Defendants.

Approved Judgment of the High Court of Justice Chancery Division Patents Court dated Jul. 3, 2009 in case No: HC 2006 C02649 between MMI Research Limited, Claimant, and (1) Cellxion Limted (2) Cellxion Networks LLC (3)Mark Brumpton (4) Datong Electronics PLC (5) Rohde & Schwarz GMBH & CO. KG. (6) Anthony Timson, Defendants.

Paget, C., "Practical Cellphone Spying," Power Point Presentation, Defcon 18, Aug. 1, 2010.

"IMSI-Catcher," Wikipedia encyclopedia entry, http://en.wikipedia.org/wiki/IMSI_catcher, Oct. 23, 2010.

Hendry, Introduction to CDMA [retrieved on Jan. 18, 2012] Retrieved from the Internet: <URL: http://web.archive.org/web/20100105123347/http://www.bee.net/mhendry/vrml/library/cdma/cdma.htm>] Jan. 29, 2010 [from WayBack Machine] (18 pgs.).

Written Opinion of the International Searching Authority for International Application No. PCT/US2011/057549, filed Oct. 24, 2011, Written Opinion of the International Searching Authority dated Jan. 19, 2012 and mailed Jan. 31, 2011 (5 pgs.).

International Search Report for International Application No. PCT/US2011/057549, filed Oct. 24, 2011, International Search Report dated Jan. 19, 2012 and mailed Jan. 31, 2011 (3 pgs.).

Office action issued in U.S. Appl. No. 12/911,655, filed Oct. 25, 2010, entitled Femtocell Configuration, inventor Eric Sabol, Office action mailed Apr. 12, 2012 (30 pages).

Office action issued in U.S. Appl. No. 12/911,655, filed Oct. 25, 2010, entitled Femtocell Configuration, inventor Eric Sabol, Office action mailed Aug. 13, 2012 (29 pages).

Written Opinion of the International Searching Authority for International Application No. PCT/US2011/057547, filed Oct. 24, 2011, Written Opinion of the International Searching Authority dated Jan. 24, 2012 and mailed Feb. 23, 2011 (5 pgs.).

International Search Report for International Application No. PCT/US2011/057547, filed Oct. 24, 2011, International Search Report dated Jan. 24, 2012 and mailed Feb. 23, 2011 (3 pgs.).

* cited by examiner

PORTABLE CELLULAR BASE STATION CONFIGURATION

RELATED APPLICATION(S)

This application may be considered related to U.S. patent application Ser. No. 12/911,665 entitled "Femtocell Configuration" filed on even date herewith in the name of the same inventor and commonly assigned.

TECHNICAL FIELD

This disclosure is directed to the technical field of digital cellular telecommunications networks.

BACKGROUND

In the aftermath of natural (e.g., earthquakes, hurricanes, tornadoes, and the like) and man-made (e.g., terrorism, arson, nuclear, biologic and chemical attacks, and the like) disasters ("events"), a situation often arises in which victims are trapped in unknown locations within an "affected area", for example under the rubble of one or more collapsed buildings. In such a scenario, there is a very small window of time within which emergency responders may locate victims in time to provide potentially life-saving assistance. Typically, this problem is addressed through relatively low-tech methods such as the use of rescue dogs, listening for sounds, looking for heat signatures with thermal imaging equipment, and the like; however, such methods are limited in effectiveness and ability to scale. This invention provides a novel additional approach which can rapidly locate victims by geolocating their cell phones.

Cellular geolocation is not a new concept; modern cellular networks are designed to keep track of the approximate locations of their users. However, such location information is only known to the network providers and its disclosure may be subject to certain legal and physical limitations, which means that it is not of immediate (e.g., within the first few hours after occurrence of the event) use to emergency responders. In a search and rescue scenario, it is critical that emergency responders be self-sufficient; that is, that they arrive on the scene with all of the equipment needed to do their jobs, and are not required to wait for information to be provided by third parties.

Overview

A method and apparatus for configuring a portable first cellular base station to operate in a digital cellular telecommunications network includes: placing the first cellular base station in the digital cellular telecommunications network; detecting with a radio receiver at least one second operating cellular base station within the digital cellular telecommunications network; demodulating a first transmission of the at least one second cellular base station transmitter to obtain a first data stream; predictively modifying the first data stream to create a modified first data stream; correlating at least one periodic portion of the modified first data stream to form an enhanced data signal; decoding the enhanced data signal to obtain information including at least the location area code for the at least one second operating cellular base station and a neighbor list of neighboring cellular base station scrambling codes; and configuring the first cellular base station to have the same scrambling code as one of the neighboring cellular base stations, a different location area code from that neighboring cellular base station, and not to connect to any cell phone attempting to initiate a connection with it.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings.

DESCRIPTION OF EXAMPLE EMBODIMENTS

Example embodiments are described herein in the context of methods and circuitry usable in a digital cellular telecommunications transceiver. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, FPGAs, ASICs, or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

The approach described herein in essence sets up a "cooperative" portable cellular base station brought to the affected area by rescue personnel to mimic one or more extant cellular base stations of existing digital cellular telecommunications networks covering the affected area. The approach has four primary steps. These are: (1) survey the signal environment by receiving signals transmitted by local cellular base stations; (2) for each cellular telecommunications network use the survey results to determine how best to configure the cooperative base station signals in the next step; (3) for each cellular telecommunications network transmit a set of cooperative base station signals over the affected area—the cooperative base station signals are designed to attract the cell phones associated with the cellular telecommunications network in the affected area, and in doing so elicit radio frequency (RF) transmissions from those cell phones that can then be used as a basis for geolocation; and (4) use the elicited RF transmissions from the cell phones to geolocate each cell phone. Some or all of these steps may be repeated periodically if required by circumstances. Each of these steps is described in more detail below.

The cooperative cellular base station(s) are best located somewhere in or near the affected area where they are in a position to aim their transmissions over the majority (preferably all) of the affected area. A nearby hill, for example, would be appropriate if the cooperative cellular base station antennas can be aimed appropriately.

Figure 1:
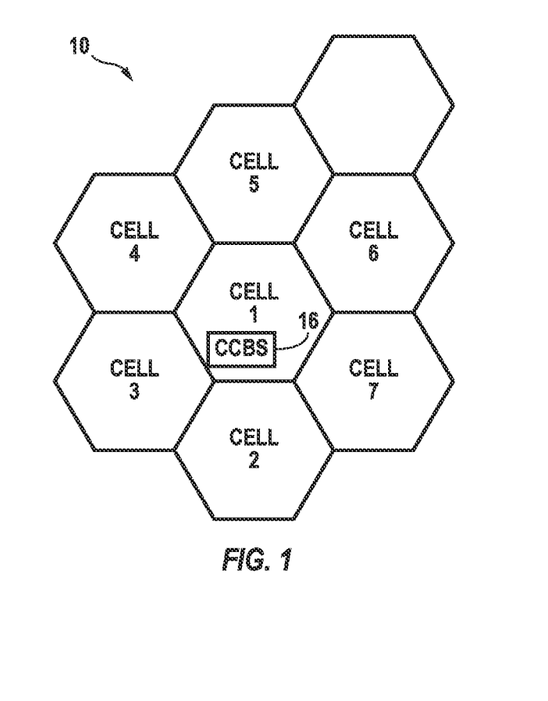
FIG. 1 is a schematic diagram of a conventional cellular telecommunications network showing a cooperative cellular base station (CCBS) deployed therein in accordance with an embodiment of the present invention.
Figure 2:
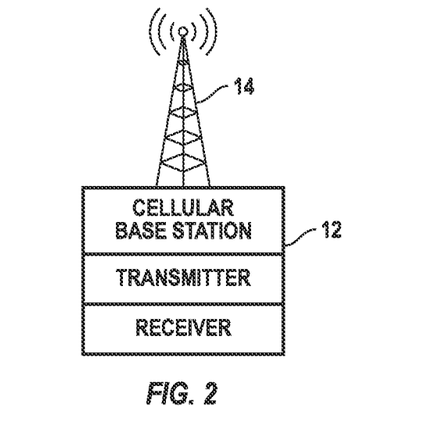
FIG. 2 is a schematic diagram of a conventional cellular base station.

FIGS. 1 and 2 illustrate a simplified digital cellular telecommunications network 10 having a number of cells (Cell 1, Cell 2, Cell 3, Cell 4, Cell 5, Cell 6 and Cell 7) deployed in an idealized manner. Each Cell has at least one cellular base station transmitter/receiver 12 and at least one corresponding antenna system 14 for transmitting and receiving signals. Cooperative cellular base station (CCBS) 16 is deployed within the cellular telecommunications network 10 in or near an affected area and generally within range of more than one cellular base station 12. It may be deployed within a nominal cell boundary or at an edge.

Step 1—Survey: The goal of the survey is to identify the following information about active cellular telecommunications networks in the affected area. A first portion of the survey is conducted in order to detect nearby cellular base stations within each network from which the cooperative cellular base station may obtain information about the cellular telecommunications network. The goal of such detection is to determine the cellular base stations that are present. This step does not involve "drilling down" into signal internals (complete demodulation and decoding). It simply involves (for the example case of UMTS/WCDMA) identifying the scrambling code used by each cellular base station heard, and the corresponding received power. A second portion of the survey is subsequently carried out in order to attempt to recover detailed System Information ("SysInfo") broadcast by each of the cellular base stations detected in the previous step. The SysInfo contains more detailed information useful to the configuring of a cooperative cellular base station operating in a cellular telecommunications network. The recovery of SysInfo is done by demodulating each cellular base station signal (converting it from an analog radio signal to a data stream, e.g., of 1's and 0's) and decoding the SysInfo into intelligible information. The cooperative cellular base station can then use the SysInfo received from other cellular base stations for its configuration. Demodulation and decoding of SysInfo is limited by signal to interference plus noise ratio ("SINR") (i.e., thermal noise as well as interference from other base stations), so full SysInfo recovery is typically not feasible for many of the cellular base stations that may be detected. In an embodiment of the present invention, PSVI techniques as described in more detail below may be used to better demodulate and decode SysInfo so as to recover full SysInfo for more of the cellular base stations detected.

The substeps to Step 1 are:

1. Determine the signal type used by the cellular communications network (i.e., the physical layer technology used on the air interface (e.g., GSM, CDMA2000, UMTS/WCDMA, and the like)).

2. Determine the RF transmission frequencies used by the cellular base stations present.

3. Determine the received power level (at the cooperative cellular base station) of each cellular base station detected.

4. Determine the System Information (SysInfo) set of parameters transmitted by each cellular base station.

5. Determine the number of networks present. For the purposes described here, a network is defined as a unique (signal type, network provider) pair. The network provider information is part of the SysInfo transmitted by each base station. For example, an area might have 4 "networks" as follows:

(1) AT&T, UMTS/WCDMA
(2) AT&T, GSM
(3) Verizon, CDMA2000 and
(4) T-Mobile, UMTS/WCDMA Recovery of the above information (network identification and type) can be done using standard processing steps that are familiar to cellular communications network engineers. For example, cell phones go through these same steps when they are first powered on. Because these steps are considered standard, they are not described in further detail here.

As will be seen in the subsequent steps, recovery of the SysInfo is instrumental in configuring the cooperative base station. The cooperative base station signal must fit seamlessly into the commercial network in order to be able to influence cell phones that operate on that network. For this reason, the use of predictive synchronous video integration (PSVI) (described in more detail below) to enhance survey results may be advantageously utilized. PSVI involves coherently integrating or correlating multiple received copies of SysInfo messages in order to improve reception, and provides a significant improvement in the reception range over which SysInfo can be successfully recovered from nearby cellular base stations.

Step 2—Configuration Derivation: The goal of this step is to determine the appropriate configuration for each cooperative cellular base station signal. Note that one cooperative base station signal will ideally be transmitted for each network detected during the survey (where a "network" is as defined above in Step 1).

While in a powered-on state, each cell phone is "locked on" to a cellular base station, called the serving cell. A cell phone can change its serving cell at its own discretion in order to improve its received signal quality. This is implemented through a cell reselection procedure, in which the cell phone periodically makes measurements on a number of cellular base stations and selects the one with the strongest received signal with which to communicate. Each cellular base station transmits a neighbor list, which is a list of nearby base stations, as part of its SysInfo. Each cell phone that is locked to a particular serving cell is obligated to measure the signal strength of each cellular base station in the serving cell's neighbor list.

The basic idea behind configuring the cooperative cellular base station is to mimic a cellular base station that appears frequently in the neighbor lists of cellular base stations serving the affected area. Such a cellular base station is called the "Target Neighbor". What is meant by "mimic" is that the cooperative base station is configured to transmit using many of the same physical parameters (frequency, spreading code, timing, and the like) as the Target Neighbor—basically, whatever parameters are needed for the cooperative base station to be recognized by cell phones in the affected area as a legitimate neighboring cellular base station. Note that the actual Target Neighbor will still be transmitting since it is part of the commercial network and there is no practical way to turn it off quickly. In order to avoid interference to the CCBS from the Target Neighbor, the CCBS will have to overpower the Target Neighbor over the affected area. It is therefore desirable that the selected Target Neighbor be relatively weak (but omnipresent) over the affected area, in order to reduce the required transmit power of the CCBS signal.

With this background in mind, the specific steps for choosing the Target Neighbor are as follows:
1. Obtain the neighbor list from the SysInfo received from each cellular base station on the network.
2. Find the neighbor cellular base station that appears the most often.
3. If there is one neighbor cellular base station that appears more often than all others, select it to be the Target Neighbor.
4. Otherwise, if there is a tie, select the cellular base station with the lowest received power at the CCBS (measured during the survey) to be the Target Neighbor. If a particular cellular base station listed in the neighbor lists is not received at the CCBS, assume it has lower received power than those that are received successfully.
5. The SysInfo parameters that are transmitted by the CCBS should generally be the same as that of the Target Neighbor, with a few important exceptions:
    5a. The field indicating the Location Area of the cell (LAC or Location Area Code) should be changed to something different than that used by the Target Neighbor. The reason for this is that when the cell phone reselects to a cell that uses a different LAC, it is required to attempt to contact the network (i.e., the CCBS) which will be programmed to refuse the connection in this application. This therefore forces the cell phones to then endlessly (until their batteries are exhausted) transmit RF energy that is needed as a basis for geolocation. For this reason the CCBS should not be activated until the geolocation equipment is ready to geolocate the cell phone signals.
    5b. The fields that govern the power level at which cell phones should transmit when trying to connect to the network should be set to encourage the use of maximum power. This will help to ensure that the energy transmitted by the cell phones can be effectively used for geolocation (e.g., as it may have to pass through rubble and collapsed structures).

Occasionally it may be the case that no single Target Neighbor covers the entire affected area. In such a case, multiple Target Neighbors may have to be used. Essentially, this involves treating each one as a separate network; i.e., there will be a separate CCBS signal for each Target Neighbor.

Step 3: Transmission: The next step is to transmit the set of cooperative signals determined in the previous step. This can be done using appropriately configured commercial base station equipment, but a more convenient approach is to use a software defined radio (SDR). SDRs are well known to those of ordinary skill in the art. The SDR approach is attractive because the same equipment can be used to support various networks, whereas separate commercial base station equipment would have to be used for each network in the absence of an SDR. In addition, the same SDR equipment can be used to conduct the survey and configuration steps, thus yielding a highly compact and transportable system.

The SDR platform ideally would be designed with enough processing resources to transmit each CCBS signal in parallel (simultaneously or nearly simultaneously). This helps to reduce the overall time of the operation, which may be critical if lives are at stake.

Once the configuration information from the previous step is known, constructing each CCBS signal that is to be transmitted by the SDR is straightforward. The fact that the SDR does not have to engage in any handshaking with the phones that will attempt to connect upon receiving the cooperative signal is a major simplification. This means that only the physical channels that carry the SysInfo (and any supporting channels such as pilot and synchronization) need to be included. Generation of these physical channels is described in detail in the appropriate signal protocol specification documents and is well within the expected skill set of a cellular telecommunications network engineer having ordinary skill in the art.

The transmit RF power used for the cooperative cellular base station should be made as high as is practical for two reasons. First, it is typically desirable to cover as large an area as possible. Second, in many disaster scenarios, additional RF energy may be needed to penetrate collapsed buildings or earth.

Step 4—Geolocation: The transmission of the CCBS signals in the previous step causes phones within range of the CCBS to periodically transmit short bursts of RF energy in an attempt to connect to the cellular telecommunications network via the CCBS. They will never succeed because the CCBS will be programmed not to accept the connections, forcing the cell phones to continue to act like a beacon by repeatedly transmitting. The final step is to use this RF energy as the basis for geolocating (and optionally identifying) the phones.

The cellular base stations and the geolocation equipment are separate systems, so their use needs to be coordinated among the respective teams operating them. One point in this regard is that the CCBS should not be activated until the geolocation equipment is in place and operational as otherwise cell phone battery reserves may be needlessly depleted.

Many different methods exist for geolocation. A straightforward conventional approach is to set up a number (3 or more) of mobile listening posts to determine a bearing from each listening post to each received cell phone signal. Where the bearings intersect, a cell phone is located. Because the cell phone will transmit its mobile identification number with each RF energy burst, it can be uniquely identified as can its owner when the data becomes available from the network owner. Construction and operation of such triangulation-based direction finding systems is well known to those of ordinary skill in the art and will therefore not be further described herein.

A related conventional approach, known as Time Difference of Arrival (TDOA), relies on timing measurements to geolocate cell phones. In this approach, the time at which a distinct feature of the phone's RF signal arrives at each listening post is precisely measured using a common reference clock. The differences between the times of arrival can be used to estimate the location of the originating cell phone.

Construction and operation of such TDOA systems is well known to those of ordinary skill in the art and will therefore not be further described herein.

Airborne geolocation methods also exist. In these approaches, the listening posts are airborne receivers. This has the benefit not only of increasing the field of view, but also enables the geolocation to be performed with a single listening post rather than multiple listening posts. In essence, rather than using multiple receivers to make geolocation measurements at the same time, the same receiver is used to make measurements at different points in time from different positions.

When geolocation measurements are made at different points in time, it is necessary to group different bursts that emanate from the same cell phone. This can be done by demodulating and decoding each transmitted burst to recover mobile identification information transmitted by the phone. Multiple bursts that have the same mobile identification number can be used together to form a more accurate geolocation result for each cell phone.

Predictive SVI Background: Application of SVI to the reception of cellular SysInfo requires some modifications to what is known as the classical SVI approach. This modified SVI approach is referred to herein as "Predictive SVI" or "PSVI", based on its ability to predict the variations seen at the receiver caused by known changes in the underlying data, and use this knowledge to restore the data to a state where classical SVI can be applied.

Classical SVI is a known signal processing technique for improving the received signal quality of periodic waveforms by integrating (or correlating) repeated copies of the same data. This technique works well but is limited to strictly periodic data, i.e., data that repeats exactly. Improved reception of the SysInfo messages broadcast by cellular base stations is desired; however, because transmitted SysInfo is not strictly periodic, the use of classical SVI is precluded. PSVI offers a method for restoring strict periodicity to quasi-periodic SysInfo in order to enable use of SVI techniques for enhanced data recovery.

The quasi-periodic nature of cellular SysInfo can be understood by examining the transmission model for such information. This model is described below in detail for the specific case of UMTS/WCDMA. As pointed out above, other cellular technologies operate in a similar manner and those of ordinary skill in the art having the benefit of this disclosure will be able to apply the PSVI techniques described herein to them, as desired.

Figure 3:
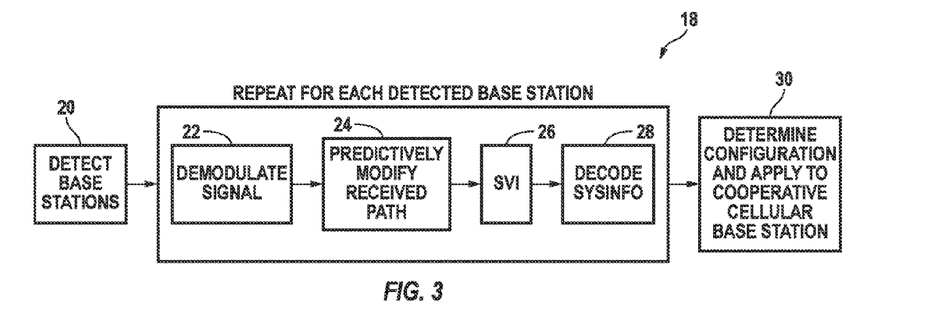
FIG. 3 is a process flow diagram for a process for configuring a CCBS in accordance with an embodiment of the present invention.

PSVI may be used in the processing chain as illustrated generally in FIG. 3. PSVI significantly improves reception of SysInfo from neighboring cellular base stations. Specifically, SysInfo can be recovered from more neighboring cellular base stations. SysInfo can be obtained from cellular base stations that are farther away, have lower transmit power, or whose signal path is obstructed (by buildings, trees, and the like). PSVI also enables faster SysInfo recovery in marginal SINR cases. This is because PSVI averages together (correlates) a large number of noisy copies of the transmitted SysInfo, rather than taking the time necessary for a clean copy to randomly occur at the receiver. More specifically, FIG. 3 illustrates a PSVI cooperative cellular base station configuration process 18 in accordance with an embodiment of the invention. In the process 18, the cooperative cellular base station is powered on and detects other cellular base stations which may be nearby 20. For each cellular base station detected the signal received from the cellular base station is demodulated 22 and SysInfo data is acquired. The data is manipulated (predictive modification) to counter the effects of transmission which operate to make it not strictly periodic 24. When the data is rendered periodic once again SVI techniques may be used to coherently integrate or "correlate" the data over a plurality of transmissions so as to improve the reception quality 26. Then the SysInfo is decoded 28 using a priori knowledge of the cellular communication network protocol in use. (Steps 22-28 may be repeated for each or a selected subset of base stations detected). Once acquired, the SysInfo is used at 30 to configure the CCBS. The process 18 may be periodically repeated as desired to provide current information to the CCBS.

In order to explain predictive modification of a received and demodulated data stream as carried out in the PSVI process and how it differs from a classical SVI process, as a (very simplified) example, suppose that the SysInfo to be acquired was represented by the bits 010. (Now, in reality a great many more bits would be involved, however this example should serve to make clearer the process of PSVI as contemplated herein). The value 010 is sent repeatedly and periodically without anything acting to disrupt the periodicity of the signal. A receiver subject to noise and interference receives, say, 010 001 010 011 110 010 010 000 010 010. Using an SVI approach one would count 9 of 10 occurrences of 0 in the first bit slot, 8 of 10 occurrences of 1 in the second bit slot, and 8 of 10 occurrences of 0 in the third bit slot. Using any number of statistical and mathematical fitting algorithms it would be correct then to conclude that in all likelihood, what was originally sent was 010. This is, in essence, the technique of classical SVI.

In cellular telephone networks where periodic data is modified to become quasi-periodic data for various reasons having to do with its encoding and transmission, but where the rules governing that modification are known or knowable, it is possible to "predictively modify" the received data stream back to one having periodic components and then apply SVI techniques for signal enhancement. Thus, assume that the original signal sent was a repeating 010, i.e., 010 010 010 010 010 010 010 010 010 010. However, the various encoding and transmission techniques applied had the effect of causing the $2^{nd}$, $4^{th}$, etc. three-bit groups to become XORed so that the signal transmitted became: 010 101 010 101 010 101 010 101 010 101. Now, suppose the signal actually received (subject to noise and interference) is: 010 110 010 100 110 101 010 111 010 101. Without applying predictive modification one would count 6 of 10 occurrences of 1 in the first bit slot, 7 of 10 occurrences of 1 in the second bit slot, and 7 of 10 occurrences of 0 in the third bit slot which might cause one to conclude that the original data was 110—which would be wrong. Using predictive modification in this case one would undo (or invert) the XOR to the $2^{nd}$, $4^{th}$, etc. bit groups to reform the original data stream thus obtaining: 010 001 010 011 110 010 010 000 010 010. Using an SVI approach on the predictively modified data stream one would then count 9 of 10 occurrences of 0 in the first bit slot, 8 of 10 occurrences of 1 in the second bit slot, and 8 of 10 occurrences of 0 in the third bit slot. As before, using any number of statistical techniques well known to those of ordinary skill in the art of signal processing, it would be correct then to conclude that in all likelihood, what was originally sent was 010. This would be correct and this approach (although greatly simplified) is the essence of PSVI.

Figure 4:
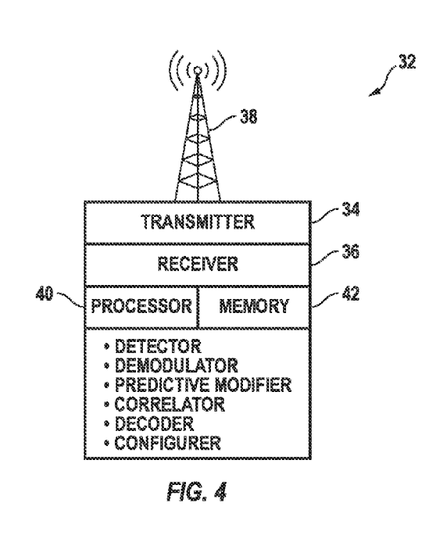
FIG. 4 is a schematic diagram of a CCBS in accordance with an embodiment of the present invention.

FIG. 4 illustrates a cooperative cellular base station 32 in accordance with an embodiment hereof. The cooperative cellular base station includes a transmitter 34 for transmitting signals to the cellular communications network, a receiver 36 for receiving signals from the cellular communications network, and at least one antenna 38 coupled to transmitter 34 and receiver 36. One or more processors 40 and memory 42 are programmed to perform detector functions (detection of nearby cellular base stations); demodulator functions (demodulation of analog signals from receiver 36 to digital data streams); predictive modifier functions (inversion of processes used by other cellular base stations prior to transmission to restore periodicity to the received data stream); correlator functions (statistical enhancement of periodic data streams); decoder functions (decoding of portions of the received data stream to provide information); and configure functions (application of information to configuration of the cooperative cellular base station).

Some specific examples of how cooperative cellular base station configuration can be improved by using the SysInfo of neighboring cells in real cellular communications networks are described below.

Neighbor lists: Each base station transmits a neighbor list as part of its SysInfo. The neighbor list is important because it tells cellular devices (e.g., cell phones and similar devices) in that particular cell what other base stations they might be handed off to. Neighbor lists are therefore important for seamless network operation as users move around. In this particular application they are critical to the identification of the Target Neighbor as described above.

PSC selection: In accordance with the UMTS/WCDMA standard, each base station transmits on a scrambling code called a Primary Scrambling Code (PSC), which is drawn from a set of 512 known codes. In order to minimize interference, the same PSC should not generally be used by different base stations with overlapping coverage areas—in fact, network providers typically try to keep these instances of PSC re-use as geographically far away as possible (part of this has to do with the fact that neighbor lists are specified by PSC, so PSC is treated by the network as being unique within a localized area). In this application, however, it is desired to copy the PSC of the Target Neighbor for mimicking purposes.

Location Area: A location area is defined as a hierarchical group of cells—they are grouped by the network to facilitate network operation and to make the overall network more efficient. Each cell belongs to a particular location area, and transmits its location area code (LAC) as part of the SysInfo. When a cell phone selects a new serving cell with a different LAC from its last serving cell it is required by protocol to contact the cellular telecommunications network (via the new serving cell). This feature is used herein to force the cell phone to transmit endlessly as a beacon by setting the LAC of the CCBS to a different value from that used by the Target Neighbor and then refusing to allow any cell phone to connect to the CCBS.

SysInfo is broadcast by each cellular base station in a cellular telecommunications network. The same information is repeatedly broadcast roughly every few seconds in order to provide timely information to cell phones that may be trying to connect to the cellular telecommunications network at any particular time. UMTS/WCDMA SysInfo is comprised of several different messages called System Information Broadcast (SIB) messages. There are different types of SIBs (e.g., Type 1, Type 2, and the like) that carry different types of information. Not all SIB types are necessarily transmitted; each base station may transmit its own subset of the predefined SIB types. Within each SIB type, the contents of repeated messages are identical; for example, each SIB Type 1 message contains the exact same data as all of the others. However, in the process of being mapped to the physical layer for transmission, these identical messages go through several steps that erode this strict periodicity, resulting in a transmitted signal that is only quasi-periodic. The details of this transmission process are described in the following paragraphs for the purpose of predictive modification. Other cellular telecommunications protocols will vary somewhat in detail, however the general approach to predictive modification will be essentially the same.

The first step undergone by the SIB messages is segmentation. In this step, variable-length SIB messages are "chopped up" into fixed-length segments. The next step involves time-multiplexing the various SIB segments into a single data stream called the BCH transport channel, which consists of 20 ms (millisecond) transport blocks. Each transport block can carry a single SIB segment, and also contains a system frame number (SFN), which is an 11-bit sequential counter. Each SIB type is allowed to have its own repetition period, as scheduled by the base station. For example, SIB Type 1 messages may be configured to repeat every 320 ms, while SIB Type 2 may repeat every 640 ms. A special type of SIB, called the Master Information Block (MIB), indicates which other SIB types are present and what repetition period is used for each one. The MIB is always present and repeats every 80 ms.

The BCH transport blocks then undergo a series of physical layer processing steps that prepare the data for transmission over the air interface. First, each transport block is encoded with a 16-bit CRC (cyclic redundancy check) which is appended to the end of the transport block. The data is then encoded with a rate ½ convolutional code with a constraint length of 9. The data then goes through two interleaving steps before being mapped onto a specific physical channel (called the P-CCPCH) for transmission over the air interface.

With an understanding of the transmission model in place, it is now possible to explain in detail what is meant by calling the SysInfo data a quasi-periodic signal. First note that although successive copies of corresponding SIB segments are themselves periodic, the composite transport channel is not periodic because it contains many different SIB types multiplexed together, with each one potentially repeating at a different period. Furthermore, even if the transport block stream only contained a single SIB type it still would not be strictly periodic. This can be seen by considering two successive transport blocks that carry identical SIB segments. Although they contain the same payload data, these blocks will have different SFN values. During CRC encoding, these different SFN values cause the resulting 16-bit CRC's to differ. The differences in the SFN and CRC bits are then amplified by the convolutional encoding process, because each differing bit at the input to the encoder causes up to 9 bits to be different at the encoder output due to the encoder memory (constraint length=9). Bit differences are further propagated by the interleaving steps. The net result of all of these effects is to obscure the underlying periodicity of the SIB messages, and to render classical SVI unusable. PSVI, on the other hand, manipulates received data, specifically the data that carries the SysInfo messages, to restore the periodicity so that classical SVI can be applied. The details of an embodiment of the PSVI technique are now explained.

Description of input to PSVI (specific to UMTS/WCDMA): PSVI input consists of received P-CCPCH bits as described in Section 5.3.3.3 of $3^{rd}$ *Generation Partnership Project; Technical Specification Group Radio Access Network; Physical channels and mapping of transport channels onto physical channels (FDD); Release 7; 3GPP Specification Document TS* 25.211 *Version 7.3.0 Revised* 2007-09.

It is assumed that the transmission gaps at the beginning of each slot have already been removed, so that each slot contains 18 bits. Each frame (15 slots) therefore contains 270 P-CCPCH bits. The input is assumed to contain at least 200 consecutive frames (2 seconds worth of data). Generally speaking the results improve as the amount of input data increases.

Outline of PSVI steps (specific to UMTS/WCDMA): The following is a top-level overview of steps implementing PSVI. Details are provided in the paragraphs that follow.
1. De-interleave each received frame
2. Group the de-interleaved frames into P-CCPCH blocks (2 possible groupings)
3. Apply SVI to MIB
   For each P-CCPCH block grouping:
   3a. De-interleave each P-CCPCH block
   3b. Determine the MIB starting block
   3c. Find SFN of the MIB starting block
   3d. Derive and apply corrections to restore MIB block invariance
   3e. Integrate MIB blocks (classical SVI)
   3f. Decode MIB block
4. Determine correct P-CCPCH block grouping (from Step 2)
5. Group SIB segments
6. Process each SIB segment group:
   6a. Derive and apply corrections for each SIB segment group
   6b. Integrate SIB segments (classical SVI)
   6c. Decode SIB segment
7. Process each SIB type:
   7a. Reassemble SIB message (if segment CRCs all check)
   7b. Apply ASN1 decoding to each reassembled SIB message Step 1: De-interleave each received frame: This is a standard de-interleaving step that undoes the "$2^{nd}$ interleaving" step applied at the transmitter. This step is described in detail in Sec 4.2.11 of $3^{rd}$ *Generation Partnership Project; Technical Specification Group Radio Access Network; Multiplexing and channel coding (FDD); Release 7; GPP Specification Document TS* 25.212 *Version* 7.6.0 *Revised* 2007-09. In this case, the parameter R2=9.

Step 2: Group the de-interleaved frames into P-CCPCH blocks (two possible groupings): A P-CCPCH block is defined here to be a group of 2 consecutive radio frames output by the previous de-interleaving step. Each P-CCPCH block therefore contains 270*2=540 bits and represents 20 ms. Note that there are two possible ways to group the frames into P-CCPCH blocks: starting with even frames and starting with odd frames. Each of these groupings is generated here. Specifically:
2-1. Let the input frames be numbered 0, 1, 2, etc.
2-2. P-CCPCH block group #1 contains:
   2-2a. P-CCPCH Block 0 (frame 0, frame 1)
   2-2b. P-CCPCH Block 1 (frame 2, frame 3)
   2-2c. P-CCPCH Block 2 (frame 4, frame 5)
   2-2d. Etc.
2-3. P-CCPCH block group #2 contains:
   2-3a. P-CCPCH Block 0 (frame 1, frame 2)
   2-3b. P-CCPCH Block 1 (frame 3, frame 4)
   2-3c. P-CCPCH Block 2 (frame 5, frame 6)
   2-3d. Etc.

Step 3: Apply SVI to MIB: This step applies the PSVI technique to the Master Information Block (MIB). Note that the sub-steps 3a-3f are repeated for each of the two P-CCPCH block groupings generated in the previous Step 2.

Step 3a: De-interleave each P-CCPCH block: This is a standard de-interleaving step that undoes the "$1^{st}$ interleaving" step applied at the transmitter. This step is described in detail in Sec 4.2.5 of $3^{rd}$ *Generation Partnership Project; Technical Specification Group Radio Access Network; Multiplexing and channel coding (FDD); Release 7; GPP Specification Document TS* 25.212 *Version* 7.6.0 *Revised* 2007-09. In this case, the parameter C1=2 and R1=270.

Step 3b: Determine the MIB starting block: MIB blocks are guaranteed to occur every 80 ms in UMTS/WCDMA, which means that every fourth P-CCPCH block contains an MIB. However, it is unknown whether the first received MIB appears in the first, second, third or fourth received block. The MIB starting block can be determined as follows:
   3b-1. Let the de-interleaved P-CCPCH blocks (resulting from Step 3a) be numbered 0, 1, 2, etc. Make sure that the total number of blocks is a multiple of 4 by discarding the highest numbered blocks if necessary.
   3b-2. Group the blocks into 4 groups as follows:
      3b-2a. Group 0 contains every fourth block starting with block 0
      3b-2b. Group 1 contains every fourth block starting with block 1
      3b-2c. Group 2 contains every fourth block starting with block 2
      3b-2d. Group 3 contains every fourth block starting with block 3
   3b-3. For each group:
      3b-3a. Form a matrix whose rows correspond to each block in the group
      3b-3b. Sum down the columns of the matrix, resulting in the vector 's'
      3b-3c. Take the absolute value of each element in vector 's', and add the absolute values together. Define this quantity as the score for group 'i'.
   3b-4. Determine which group has the largest score. Define the MIB starting block as block 'i', where group 'i' has the largest score.

Step 3c: Find SFN of the MIB starting block: The system frame number (SFN) of the data must be recovered before PSVI can be applied. Although the SFN is contained in each P-CCPCH block, the presumption here is that the data fidelity is too low (due to noise and interference) to allow reliable direct recovery of the SFN—otherwise one could just directly recover all of the data and there would be no need for SVI. Instead, a trial-and-error approach is used in which a hypothesis test is performed for each possible SFN value. The specific steps are as follows:
   3c-1. Define the set of blocks B as the group with the largest score in Step 3b. Number the blocks in B from 0 to N-1.
   3c-2. Define the set of possible base SFN values as (0, 4, 8, 12, . . . 2044)
   3c-3. For each possible base SFN value 'b'
      3c-3a. For each block 'k' within the set B (k from 0 to N-1)
         3c-3a(i). Compute the correction mask for block k as follows:
            3c-3a(i)(1) Compute the XOR of b and (b+4*k) mod 2048, where each of these two quantities is represented as an 11-bit binary number. The resulting XOR also has 11 bits.
            3c-3a(i)(2) Build a 246-bit transport block whose first 11 bits contain the XOR from the previous step, and whose remaining 235 bits are 0.
            3c-3a(i)(3) Compute the 16-bit CRC on the 246 bits from the previous step and append the CRC bits to the end of the 246 bits to create a 262-bit block. This is described in Section 4.2.1 of $3^{rd}$ *Generation Partnership Project; Technical Specification Group Radio Access Network; Multiplexing and channel coding (FDD);*

*Release 7; GPP Specification Document TS 25.212 Version 7.6.0 Revised 2007-09.*

3c-3a(i)(4) Input the 262-bit block from the previous step to the rate ½ convolutional encoding step described in Section 4.2.3.1 of $3^{rd}$ *Generation Partnership Project; Technical Specification Group Radio Access Network; Multiplexing and channel coding (FDD); Release 7; GPP Specification Document TS 25.212 Version 7.6.0 Revised 2007-09*. This results in a 540-bit block.

3c-3a(i)(5) The result of this process is the 540 bit "correction mask". Each '1' indicates that the (postulated) SFN difference between the two blocks caused a bit difference in that position to occur between the block 0 and block k.

3c-3a(ii) Replace each 1 in the correction mask with a −1, and replace each 0 with a 1. Pair-wise multiply this correction mask with block 'k'. The result has 540 elements.

3c-3a(iii) Keep a running element-by-element sum of the result of the previous step over all blocks for this particular base SFN value.

3c-3b. Square each of the 540 elements from the running sum, and add them together. Record this value as the SVI magnitude for base SFN 'b'.

3c-4. Find the maximum SVI magnitude over all base SFN values. The corresponding base SFN is determined to be the SFN of the first block in B.

Step 3d: Derive and apply corrections to restore MIB block invariance: The idea behind this step is to predict the changes that will be caused in each MIB block due to the incrementing SFN, and then apply the proper corrections to the data so that successive MIB blocks are truly identical. This is necessary before applying the classical SVI technique, which integrates successive blocks.

3d-1. Start with the set of blocks 'B' formed in Step 1 of the previous step 3d-2. Let 'b' be the base SFN found in the previous step 3d-3. For each block 'k' within the set B (for k from 0 to N-1):

3d-3a. Compute the correction mask for block k as follows:

3d-3a(i). Compute the XOR of 'b' and (b+4*k) mod 2048, where each of these two quantities is represented as an 11-bit binary number. The resulting XOR also has 11 bits.

3d-3a(ii). Build a 246-bit transport block whose first 11 bits contain the XOR from the previous step, and whose remaining 235 bits are 0.

3d-3a(iii). Compute the 16-bit CRC on the 246 bits from the previous step and append the CRC bits to the end of the 246 bits to create a 262-bit block. This is described in Section 4.2.1 of $3^{rd}$ *Generation Partnership Project; Technical Specification Group Radio Access Network; Multiplexing and channel coding (FDD); Release 7; GPP Specification Document TS 25.212 Version 7.6.0 Revised 2007-09*.

3d-3a(iv). Input the 262-bit block from the previous step to the rate ½ convolutional encoding step described in Section 4.2.3.1 of $3^{rd}$ *Generation Partnership Project; Technical Specification Group Radio Access Network; Multiplexing and channel coding (FDD); Release 7; GPP Specification Document TS 25.212 Version 7.6.0 Revised 2007-09*. This results in a 540-bit block.

3d-3a(v). The result of this process is the 540 bit "correction mask". Each '1' indicates that the (postulated) SFN difference between the two blocks caused a bit difference in that position to occur between the block 0 and block k.

3d-3a(vi). Replace each 1 in the correction mask with a −1, and replace each 0 with a 1.

3d-3b. Pair-wise multiply the correction mask with block 'k'. Let the 540 element result be the kth row of a new matrix 'M', which has dimensions N×540.

Step 3e: Integrate MIB blocks (classical SVI): Now that the successive MIB blocks have been made truly invariant by the previous step, classical SVI is applied:

3e-1. Start with the N×540 matrix 'M' formed in the previous step.

3e-2. Sum the elements in each column of M, forming a 540 element vector 'c'. Intuitively, this vector represents a "cleaned up" version of the MIB, since many copies of the same signal (each with uncorrelated noise) have been coherently averaged together.

Step 3f: Decode MIB block: Here the standard channel decoding steps are applied to the cleaned up MIB block. Note that the de-interleaving steps are not necessary here because they were already done in previous steps.

3f-1. Start with the 540 element vector 'c' formed in the previous step.

3f-2. Apply a standard rate ½ Viterbi decoder, resulting in a 262-bit output.

3f-2a. Details of the convolutional encoding process are described in Sec 4.2.3.1 of $3^{rd}$ *Generation Partnership Project; Technical Specification Group Radio Access Network; Multiplexing and channel coding (FDD); Release 7; GPP Specification Document TS 25.212 Version 7.6.0 Revised 2007-09*.

3f-3. Run the 262-bit output from the previous step through a standard 16-bit CRC decoding process. This results in a 246-bit vector as well as a CRC check result (pass/fail).

3f-3a. Details of the CRC encoding process are described in Sec 4.2.1 of $3^{rd}$ *Generation Partnership Project; Technical Specification Group Radio Access Network; Multiplexing and channel coding (FDD); Release 7; GPP Specification Document TS 25.212 Version 7.6.0 Revised 2007-09*.

Step 4: Determine correct P-CCPCH block grouping (from Step 2): In this step, the ambiguity in the P-CCPCH block grouping from Step 2 is resolved. This is done by seeing which of the two possible groupings (if any) resulted in a positive CRC check in the previous step.

4-1. Label the CRC result from the previous step "CRC1", when P-CCPCH block group #1 (from Step 2) is used as input. Label the CRC result "CRC2" when P-CCPCH block group #2 (from Step 2) is used as input.

4-2. There are four possible results for the two CRCs:

4-2a. If CRC1 passes and CRC2 fails, this indicates that group #1 is the correct grouping. Continue to Step 5, and define the de-interleaved P-CCPCH blocks in subsequent steps as the data resulting from the first pass of Step 3a.

4-2b. If CRC2 passes and CRC1 fails, this indicates that group #2 is the correct grouping. Continue to Step 5, and define the de-interleaved P-CCPCH blocks in subsequent steps as the data resulting from the second pass of Step 3a.

4-2c. If both CRCs fail, abort processing. Typically this means that signal quality is too poor to process successfully. In some cases it may be useful to go back to Step 1 and repeat the entire processing chain using more input data.

4-2d. If both CRCs pass, go back to Step 1 and repeat the entire processing chain using different input data. Note that this condition is extremely rare.

Step 5: Group SIB segments: Having recovered the MIB, the next step is to recover the other System Information Blocks (SIBs) that carry the System Information. As with the MIB, first group repeated copies of each message before applying SVI. However, unlike the MIB, the other System Information Blocks (SIBs) are not broadcast at known times with known repetition rates. Instead, these scheduling parameters are set by the network and transmitted as part of the MIB. The standard procedure is for phones to first decode the MIB in order to learn what SIB types are present, and when they are expected to occur, before attempting to recover the other SIBs. A similar procedure is used here. In addition, SIB messages are typically segmented before being transmitted on the P-CCPCH. In other words, each P-CCPCH block in general contains a segment of a SIB message, rather than an entire message. The goal of this step is to group together the P-CCPCH blocks that carry repetitions of the same segment. For example, suppose that the SIB5 message contains 3 segments. Then form three groups for SIB5: one containing all of the first segments, one containing all of the second segments, and one containing all of the third segments.

5-1. Start with the 246-bit vector from Step 3f (corresponding to the P-CCPCH block grouping that resulted in a CRC pass).

5-2. Extract the 'data field' portion of this 246-bit segment, as described in Section 8.1.1.1.3 of $3^{rd}$ Generation Partnership Project; Technical Specification Group Radio Access Network; Radio resource control (RRC); Protocol specification; Release 7; GPP Specification Document TS 25.331 Version 7.5.0 Revised 2007-06.

5-3. Perform ASN1 decoding of the MIB block. Details on ASN1 decoding are described in International Telecommunication Union ITU-T Recommendation X680 (07/2002) "Information Technology—Abstract Syntax Notation One (ASN.1): Specification of basic notation", International Telecommunication Union ITU-T Recommendation X.681 (07/2002) "Information Technology—Abstract Syntax Notation One (ASN.1): Information object specification", and International Telecommunication Union ITU-T Recommendation X.691 (07/2002) "Information technology—ASN.1 encoding rules: Specification of Packed Encoding Rules (PER)". The ASN1 definitions from Section 11 of $3^{rd}$ Generation Partnership Project; Technical Specification Group Radio Access Network; Radio resource control (RRC); Protocol specification; Release 7; GPP Specification Document TS 25.331 Version 7.5.0 Revised 2007-06 are used.

5-4. The decoded MIB provides SIB scheduling information indicating when the other SIB segments occur. This information is described in detail in Section 8.1.1.1.5 of $3^{rd}$ Generation Partnership Project; Technical Specification Group Radio Access Network; Radio resource control (RRC); Protocol specification; Release 7; GPP Specification Document TS 25.331 Version 7.5.0 Revised 2007-06.

5-5. Use the recovered SIB scheduling information to group together de-interleaved P-CCPCH blocks (result of Step 4) containing repeated instances of each SIB segment.

5-6. As the blocks are grouped, keep track of the SFN associated with each block. The SFN of each block can be determined using the base SFN derived in Step 3c.

Step 6: Process each SIB segment group: Execute steps 6a and 6b for each SIB segment group.

Step 6a: Derive and apply corrections for each SIB segment group:

6a-1. Start with the group of de-interleaved P-CCPCH blocks for a particular SIB segment. Let the number of blocks in the group be $N_B$.

6a-2. Designate the first block in the group as the reference block. This block's SFN is the reference SFN.

6a-3. For each block 'k' within the group (for k from 0 to $N_B-1$):

6a-3a. Compute the correction mask for block k as follows:

6a-3a(i). Compute the XOR of the SFN of block 'k' and the reference SFN, where each of these two quantities is represented as an 11-bit binary number. The resulting XOR also has 11 bits.

6a-3a(ii). Build a 246-bit transport block whose first 11 bits contain the XOR from the previous step, and whose remaining 235 bits are 0.

6a-3a(iii). Compute the 16-bit CRC on the 246 bits from the previous step and append the CRC bits to the end of the 246 bits to create a 262-bit block. This is described in Section 4.2.1 of $3^{rd}$ Generation Partnership Project; Technical Specification Group Radio Access Network; Multiplexing and channel coding (FDD); Release 7; GPP Specification Document TS 25.212 Version 7.6.0 Revised 2007-09.

6a-3a(iv). Input the 262-bit block from the previous step to the rate ½ convolutional encoding step described in Section 4.2.3.1 of $3^{rd}$ Generation Partnership Project; Technical Specification Group Radio Access Network; Multiplexing and channel coding (FDD); Release 7; GPP Specification Document TS 25.212 Version 7.6.0 Revised 2007-09. This results in a 540-bit block.

6a-3a(v). The result of this process is the 540 bit "correction mask". Each '1' indicates that the (postulated) SFN difference between the two blocks caused a bit difference in that position to occur between the reference block and block k.

6a-3a(vi). Replace each 1 in the correction mask with a −1, and replace each 0 with a 1.

6a-3b. Pair-wise multiply the correction mask with block 'k'. Let the 540 element result be the kth row of a new matrix 'M', which has dimensions $N_B \times 540$.

Step 6b: Integrate SIB segments (classical SVI): Now that the successive SIB segments have been made truly invariant by the previous step, classical SVI is applied.

6b-1. Start with the $N_B \times 540$ matrix 'M' formed in the previous step.

6b-2. Sum the elements in each column of M, forming a 540 element vector 'c'. Intuitively, this vector represents a "cleaned up" version of the SIB segment, since many copies of the same signal (each with uncorrelated noise) have been coherently averaged together.

Step 6c: Decode SIB segments: Here standard channel decoding steps are applied to the cleaned up SIB segment. Note that the de-interleaving steps are not necessary here because they were already done in previous steps.

6c-1. Start with the 540 element vector 'c' formed in the previous step.

6c-2. Apply a standard rate ½ Viterbi decoder, resulting in a 262-bit output.
    6c-2a. Details of the convolutional encoding process are described in Sec 4.2.3.1 of $3^{rd}$ Generation Partnership Project; Technical Specification Group Radio Access Network; Multiplexing and channel coding (FDD); Release 7; GPP Specification Document TS 25.212 Version 7.6.0 Revised 2007-09.

6c-3. Run the 262-bit output from the previous step through a standard 16-bit CRC decoding process. This results in a 246-bit vector as well as a CRC check result (pass/fail).
    6c-3a. Details of the CRC encoding process are described in Sec 4.2.1 of $3^{rd}$ Generation Partnership Project; Technical Specification Group Radio Access Network; Multiplexing and channel coding (FDD); Release 7; GPP Specification Document TS 25.212 Version 7.6.0 Revised 2007-09.

Step 7: Process each SIB type: Execute steps 7a and 7b.

Step 7a: Reassemble SIB message: In Step 5 it was determined how many SIB segments comprise each SIB message (e.g., SIB5 contains 3 SIB segments). Each SIB message is now reassembled from its constituent SIB segments. The following steps describe the procedure to be applied to each SIB message that is present.

7a-1. Check to make sure that each of the constituent SIB segments for this SIB message passed CRC during the decoding process for Step 6c.

7a-2. If each CRC passed:
        7a-2a. Reassemble the SIB message from the constituent segments. SIB reassembly is a standard procedure described in Sections 8.1.1.1.3 and 8.1.1.1.4 of $3^{rd}$ Generation Partnership Project; Technical Specification Group Radio Access Network; Radio resource control (RRC); Protocol specification; Release 7; GPP Specification Document TS 25.331 Version 7.5.0 Revised 2007-06.

7a-3. If not all CRC's passed, there are two options:
        7a-3a. Collect more data and try again (applying SVI over a larger number of blocks increases the likelihood of success)
        7a-3b. Skip decoding this SIB message
            7a-3b(i). This means that some System Information parameters will not be recovered, which may be OK in some applications.

Step 7b: Apply ASN1 decoding to each reassembled SIB message:
    7b-1. Perform ASN1 decoding of each reassembled SIB message from the previous step to recover the SysInfo contents. This is a standard processing step; details on ASN1 decoding are described in *International Telecommunication Union ITU-T Recommendation X.680 (07/2002) "Information Technology—Abstract Syntax Notation One (ASN.1): Specification of basic notation", International Telecommunication Union ITU-T Recommendation X.681 (07/2002) "Information Technology—Abstract Syntax Notation One (ASN.1): Information object specification", and International Telecommunication Union ITU-T Recommendation X.691 (07/2002) "Information technology—ASN.1 encoding rules: Specification of Packed Encoding Rules (PER)"*. The ASN1 definitions from Section 11 of $3^{rd}$ Generation Partnership Project; Technical Specification Group Radio Access Network; Radio resource control (RRC); Protocol specification; Release 7; GPP Specification Document TS 25.331 Version 7.5.0 Revised 2007-06 are used.

The following documents are technical standards documents applicable to UMTS/WCDMA telephony standards and are hereby incorporated herein by reference as if set forth fully herein:

(1) $3^{rd}$ Generation Partnership Project; Technical Specification Group Radio Access Network; Physical channels and mapping of transport channels onto physical channels (FDD); Release 7; 3GPP Specification Document TS 25.211 Version 7.3.0 Revised 2007-09;

(2) $3^{rd}$ Generation Partnership Project; Technical Specification Group Radio Access Network; Multiplexing and channel coding (FDD); Release 7; GPP Specification Document TS 25.212 Version 7.6.0 Revised 2007-09;

(3) $3^{rd}$ Generation Partnership Project; Technical Specification Group Radio Access Network; Radio resource control (RRC); Protocol specification; Release 7; GPP Specification Document TS 25.331 Version 7.5.0 Revised 2007-06;

(4) *International Telecommunication Union ITU-T Recommendation X.680 (07/2002) "Information Technology—Abstract Syntax Notation One (ASN.1): Specification of basic notation"*, (5) *International Telecommunication Union ITU-T Recommendation X.681 (07/2002) "Information Technology—Abstract Syntax Notation One (ASN.1): Information object specification"*, and (6) *International Telecommunication Union ITU-T Recommendation X.691 (07/2002) "Information technology—ASN.1 encoding rules: Specification of Packed Encoding Rules (PER)"*

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A method for configuring a first cellular base station to operate in a digital cellular telecommunications network, the method comprising:
    placing the first cellular base station in the digital cellular telecommunications network;
    detecting with a radio receiver at least one second operating cellular base station within the digital cellular telecommunications network;
    demodulating a first transmission of the at least one second operating cellular base station to obtain a first data stream;
    predictively modifying the first data stream to restore a periodicity thereof and create a modified first data stream;
    correlating at least one periodic portion of the modified first data stream to form an enhanced data signal;
    decoding the enhanced data signal to obtain information including at least the location area code for the at least one second operating cellular base station and a neighbor list of neighboring cellular base station scrambling codes; and
    configuring the first cellular base station to:
        have the same scrambling code as one of the neighboring cellular base stations to mimic said detected at least one second operating cellular base station,
        have a different location area code from that neighboring cellular base station to cause any cell phone to attempt to contact the first cellular base station, and
    refuse connection to said any cell phone attempting to initiate a connection with the first cellular base station to cause the cell phone to act like a beacon by repeatedly attempting to connect to the first cellular base station.

2. The method of claim 1, wherein the one of the neighboring cellular base stations is selected based upon being present in a larger number of neighbor lists from different second operating cellular base stations than any other detected second operating cellular base station.

3. The method of claim 1, wherein said predictively modifying the first data stream to create a modified first data stream includes inverting at least one process applied to an original data stream by the at least one second operating cellular base station in creating the first transmission.

4. The method of claim 1, wherein said correlating at least one periodic portion of the modified first data stream to form an enhanced data signal includes storing a plurality of versions of the modified first data stream in a memory and applying a statistical technique to the plurality of versions of the modified first data stream in the memory in order to create an enhanced data signal.

5. The method of claim 1, wherein said detecting at least one second operating cellular base station further comprises:
obtaining a neighbor list of the operating base stations in the digital cellular telecommunications network from signals received from each cellular base station in the network;
finding the neighbor cellular base station that appears in the neighbor list the most often;
if there is one neighbor cellular base station that appears more often than all others, selecting it to be said at least one second operating cellular base station; and
if there is more than one neighbor cellular base station that appears more often than all others, select the cellular base station with the lowest received power at the first cellular base station to be said at least one second operating cellular base station.

6. The method of claim 1, further comprising determining geolocation of said any cell phone attempting to contact the first cellular base station, using signals from said any cell phone.

7. The method of claim 1, further comprising configuring fields of the first cellular base station that govern the power level at which said any cell phone transmits when attempting to connect to the first cellular base station to use maximum power.

8. An apparatus for configuring a first cellular base station to operate in a digital cellular telecommunications network, the apparatus comprising:
a radio receiver;
means for detecting with the radio receiver at least one second operating cellular base station within the digital cellular telecommunications network;
means for demodulating a first transmission of the at least one second operating cellular base station to obtain a first data stream;
means for predictively modifying the first data stream to restore a periodicity thereof and create a modified first datastream;
means for correlating at least one periodic portion of the modified first data stream to form an enhanced data signal;
means for decoding the enhanced data signal to obtain information including at least the location area code for the at least one second operating cellular base station and a neighbor list of neighboring cellular base station scrambling codes; and
means for configuring the first cellular base station to:
have the same scrambling code as one of the neighboring cellular base stations to mimic said detected at least one second operating cellular base station,
have a different location area code from that neighboring cellular base station to cause any cell phone to attempt to contact the first cellular base station, and
refuse connection to said any cell phone attempting to initiate a connection with the first cellular base station to cause the cell phone to act like a beacon by repeatedly attempting to connect to the first cellular base station.

9. The apparatus of claim 8, wherein the one of the neighboring cellular base stations is selected based upon being present in a larger number of neighbor lists from different second operating cellular base stations than any other detected second operating cellular base station.

10. The apparatus of claim 8, wherein the means for predictively modifying the first data stream to create a modified first data stream includes means for inverting at least one process applied to an original data stream by the at least one second operating cellular base station in creating the first transmission.

11. The apparatus of claim 8, wherein the means for correlating at least one periodic portion of the modified first data stream to form an enhanced data signal includes a memory and means for storing a plurality of versions of the modified first data stream in the memory and means for applying a statistical technique to the plurality of versions of the modified first data stream in order to create an enhanced data signal.

12. The apparatus of claim 8, wherein said means for detecting at least one second operating cellular base station further comprises:
means for obtaining a neighbor list of the operating base stations in the digital cellular telecommunications network from signals received from each cellular base station in the network;
means for finding the neighbor cellular base station that appears in the neighbor list the most often;
if there is one neighbor cellular base station that appears more often than all others, means for selecting it to be said at least one second operating cellular base station; and
if there is more than one neighbor cellular base station that appears more often than all others, means for select the cellular base station with the lowest received power at the first cellular base station to be said at least one second operating cellular base station.

13. The apparatus of claim 8, further comprising means for determining geolocation of said any cell phone attempting to contact the first cellular base station, using signals from said any cell phone.

14. The apparatus of claim 8, further comprising means for configuring fields of the first cellular base station that govern the power level at which said any cell phone transmits when attempting to connect to the first cellular base station to use maximum power.

15. A first cellular base station configured for use in a digital cellular telecommunications network, the base station comprising:
a radio receiver configured to receive digital cellular telecommunications network signals;
a detector coupled to the radio receiver configured to detect at least one second operating cellular base station within the digital cellular telecommunications network;
a demodulator configured to demodulate a first transmission of the at least one second operating cellular base station to obtain a first data stream;

a predictive modifier configured to predictively modify the first data stream to restore a periodicity thereof and create a modified first data stream;

a correlator configured to correlate at least one periodic portion of the modified first data stream to form an enhanced data signal;

a decoder configured to decode the enhanced data signal to obtain information including at least the location area code for the at least one second operating cellular base station and a neighbor list of neighboring cellular base station scrambling codes; and a configurer configured to configure the first cellular base station to:

have the same scrambling code as one of the neighboring cellular base stations to mimic said detected at least one second operating cellular base station, have a different location area code from that neighboring cellular base station to cause any cell phone to attempt to contact the first cellular base station, and refuse connection to said any cell phone attempting to initiate a connection with the first cellular base station to cause the cell phone to act like a beacon by repeatedly attempting to connect to the first cellular base station.

16. The base station of claim 15, wherein the one of the neighboring cellular base stations is selected based upon being present in a larger number of neighbor lists from different second operating cellular base stations than any other detected second operating cellular base station.

17. The base station of claim 15, wherein the predictive modifier is configured to invert at least one process applied to an original data stream by the at least one second operating cellular base station in creating the first transmission.

18. The base station of claim 15, wherein the correlator includes a memory and is configured to store a plurality of versions of the modified first data stream in the memory and to apply a statistical technique to the plurality of versions of the modified first data stream in order to create an enhanced data signal.

* * * * *